(12) United States Patent
Gordon et al.

(10) Patent No.: US 9,803,835 B2
(45) Date of Patent: Oct. 31, 2017

(54) SYSTEM AND METHOD OF SNOW AND ICE REMOVAL

(71) Applicant: Angel Technologies Holdings Inc., South Lyon, MI (US)

(72) Inventors: Osbell J. Gordon, South Lyon, MI (US); Ronald J. Ranalli, Livonia, MI (US); Douglas P. Ballnik, Milford, MI (US)

(73) Assignee: ANGEL TECHNOLOGIES HOLDINGS, INC., South Lyon, MI (US)

( * ) Notice: Subject to any disclaimer, the term of this patent is extended or adjusted under 35 U.S.C. 154(b) by 0 days.

(21) Appl. No.: 15/274,026

(22) Filed: Sep. 23, 2016

(65) Prior Publication Data

US 2017/0082268 A1    Mar. 23, 2017

Related U.S. Application Data

(60) Provisional application No. 62/222,766, filed on Sep. 23, 2015.

(51) Int. Cl.
| | | |
|---|---|---|
| *F21V 13/04* | (2006.01) | |
| *G02B 19/00* | (2006.01) | |
| *F21V 5/00* | (2015.01) | |
| *E01H 5/10* | (2006.01) | |
| *F21S 2/00* | (2016.01) | |
| *F21V 5/04* | (2006.01) | |
| *F21V 29/90* | (2015.01) | |
| *F21V 7/08* | (2006.01) | |
| *F21V 29/67* | (2015.01) | |
| *F21V 29/504* | (2015.01) | |

(Continued)

(52) U.S. Cl.
CPC ............. *F21V 13/04* (2013.01); *E01H 5/106* (2013.01); *F21S 2/00* (2013.01); *F21V 5/008* (2013.01); *F21V 5/048* (2013.01); *F21V 29/90* (2015.01); *G02B 19/0014* (2013.01); *G02B 19/0028* (2013.01); *F21V 7/08* (2013.01); *F21V 29/504* (2015.01); *F21V 29/677* (2015.01); *F21W 2131/10* (2013.01); *G02B 19/0047* (2013.01); *G02B 26/10* (2013.01)

(58) Field of Classification Search
CPC .......... F21V 13/04; F21V 29/90; F21V 5/048; F21V 5/008; F21V 29/504; F21V 7/08; F21V 29/677; F21S 2/00; F21W 2131/00; F21W 2131/10
USPC .................................................. 362/299, 368
See application file for complete search history.

(56) References Cited

U.S. PATENT DOCUMENTS

| | | | |
|---|---|---|---|
| 4,101,957 A * | 7/1978 | Chang ....................... | F21V 9/04 362/268 |
| 4,900,891 A | 2/1990 | Vega et al. | |
| 6,226,454 B1 | 5/2001 | Couture | |

(Continued)

*Primary Examiner* — Elmito Breval
*Assistant Examiner* — Naomi M Wolford
(74) *Attorney, Agent, or Firm* — Brooks Kushman P.C.

(57) ABSTRACT

A system for removing snow and ice is provided. The system has a light head mounted to rotate. A light source is mounted in the light head and radiates visible light. An optical train is mounted in the light head adjacent the light source to focus the visible light to a concentrated light beam line that is directionally focused. A controller is in communication with the light head and is programmed to rotate the light head thereby sweeping the concentrated light beam along a surface.

20 Claims, 5 Drawing Sheets

(51) Int. Cl.
  *F21W 131/10* (2006.01)
  *G02B 26/10* (2006.01)

(56) References Cited

U.S. PATENT DOCUMENTS

| | | | |
|---|---|---|---|
| 6,758,630 B1 * | 7/2004 | Vega | E01C 11/26 |
| | | | 219/213 |
| 7,783,400 B1 | 8/2010 | Zimler | |
| 7,814,898 B2 | 10/2010 | Rumbaugh | |
| 7,919,723 B2 * | 4/2011 | Ide | A01D 34/015 |
| | | | 219/121.67 |
| 9,115,475 B2 | 8/2015 | Runggaldier | |
| 2011/0067726 A1 | 3/2011 | Cochran et al. | |

* cited by examiner

SYSTEM AND METHOD OF SNOW AND ICE REMOVAL

This application claims the benefit of U.S. provisional application Ser. No. 62/222,766 filed Sep. 23, 2015, the disclosure of which is hereby incorporated in its entirety by reference herein.

TECHNICAL FIELD

A system and method are provided for using visible light for snow and ice removal along a surface.

BACKGROUND

In climates where snow and ice accumulate during winter months, it is necessary to remove the snow and ice from surfaces, such as driveways, sidewalks and parking lots, to allow safe travel by people and vehicles.

SUMMARY

According to one embodiment, a system for removing snow and ice is provided. The system has a light head mounted to rotate. A light source is mounted in the light head and radiates visible light. An optical train is mounted in the light head adjacent the light source to focus the visible light to a concentrated light beam line that is directionally focused. A controller is in communication with the light head and is programmed to rotate the light head thereby sweeping the concentrated light beam along a surface.

In another embodiment, the controller is programmed to operate the light source based on a weather forecast.

In another embodiment, the controller is programmed to operate the light source based on an outside temperature.

In another embodiment, the light head is retractable when not in use.

In another embodiment, the system includes a plurality of light heads. Each light head has a light source and an optical train and the controller is in communication with each of the light heads.

According to one other embodiment, a system for removing snow and ice is provided. The system has a housing and a light source positioned in the housing that radiates generally diffuse visible light. An optical train is mounted in the housing adjacent the light source to focus the diffuse visible light to a concentrated light beam line between a first optic and a final optic. The concentrated light beam has a concentrated power density at a focal distance from the final optic that is greater than a first power density at the first optic.

In another embodiment, the first optic comprises a lens to receive the diffuse visible light from the light source and project a spatially semi-coherent light beam toward the final optic.

In another embodiment, the final optic is a positive meniscus lens.

In another embodiment, the first optic comprises a collimating lens.

In another embodiment, the first optic comprises a plano-convex cylindrical lens.

In another embodiment, the first optic has a first focal distance that is less than the final focal distance.

In another embodiment, the optical train comprises a second optic mounted in the housing between the first optic and final optic, the second optic projecting a second power density greater than the first power density, wherein the final power density is greater than the second power density.

In another embodiment, the system includes a controller in communication with the housing. The controller is programmed to command the housing to rotate the housing thereby sweeping the concentrated beam along a surface.

In another embodiment, the system includes at least one sensor for sensing at least one of ambient temperature, ambient humidity and precipitation and providing a sensor signal to the controller. The controller is programmed to operate the light source based on the sensor signal.

According to one other embodiment, a system for removing snow and ice is provided. The system has a housing with an ellipse portion and a tube portion. A light source is mounted in the ellipse portion and radiates generally diffuse visible light. A reflector is formed in the ellipse portion for reflecting the diffuse visible light from the light source. A first lens is mounted in the tube portion and positioned at a major diameter of the reflector. The reflector reflects the light toward the first lens. The first lens shapes the light in a line-shaped beam. A second lens is mounted in the tube portion and the first lens projects the line-shaped beam toward the second lens. The second lens focuses the line-shaped beam to a concentrated beam having a concentrated power density at a second lens focal distance that is greater than a first power density at the first lens.

In another embodiment, the second lens focal distance is greater than the first lens focal distance.

In another embodiment, the concentrated beam is a elongated line-shaped beam having a second length greater than a first length of the line-shaped beam from the first lens. The length of the first line-shaped beam may be generally equal to a diameter of the second lens.

In another embodiment, light reflected from the reflector is partially spatially coherent.

In another embodiment, a motor is connected to the housing for rotating the housing and thereby sweeping the concentrated beam over a surface.

In another embodiment, the light source comprises a halogen bulb.

In another embodiment, the first lens is mounted a distance from the second lens based on the second lens focal distance.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
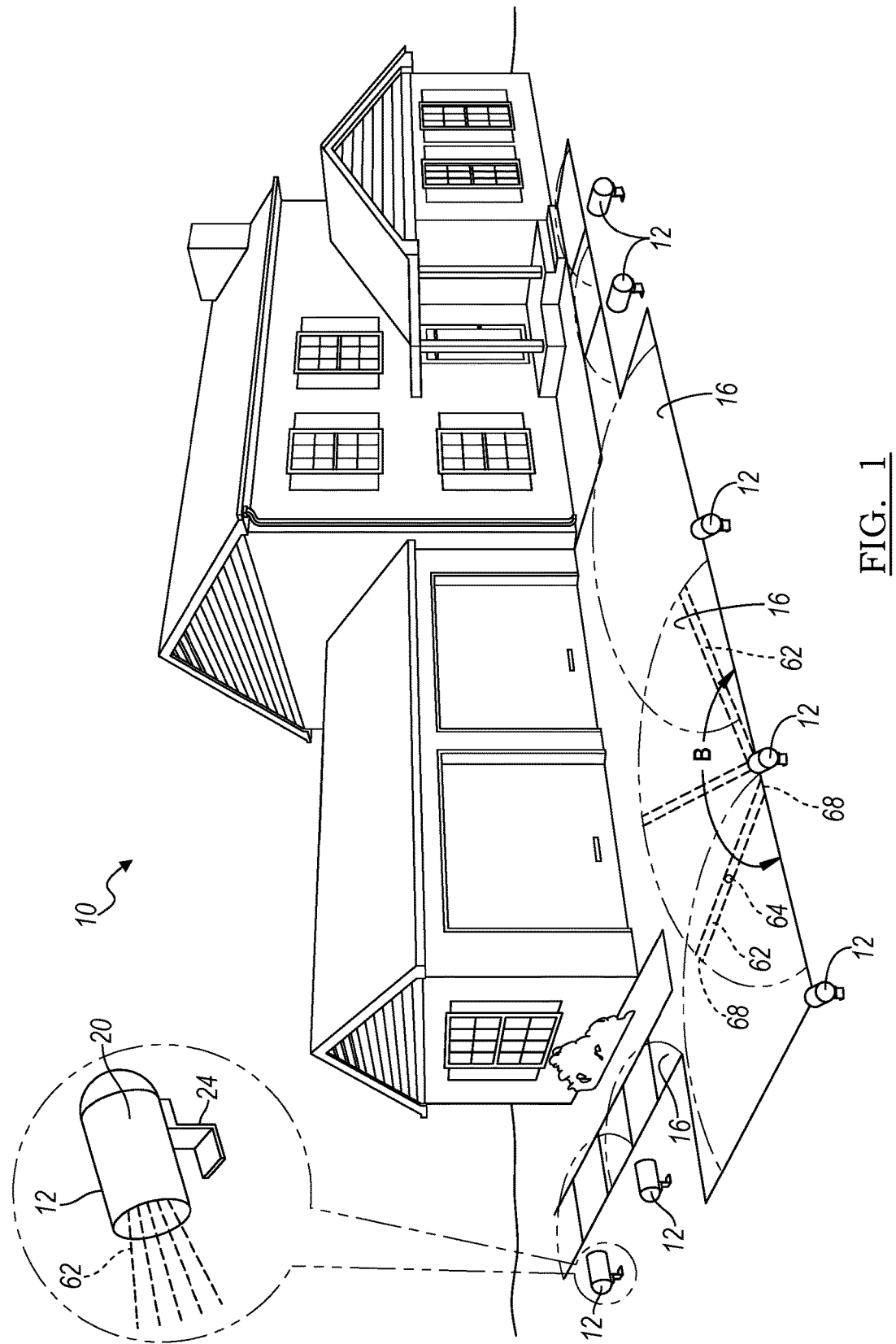
FIG. 1 illustrates a snow removal system according to one embodiment.

FIG. 1 illustrates a snow clearing system 10 having a plurality of rotating light heads 12. The rotating light heads 12 act as light 'sprinkler' heads for distributing focused light in a direction to generate heat and spatially dense light waves for removing and preventing snow and ice from surfaces 16. The surfaces 16 may include driveways, walkways, roofs, parking lots, fields or any surface where snow or ice may accumulate.

Figure 2:
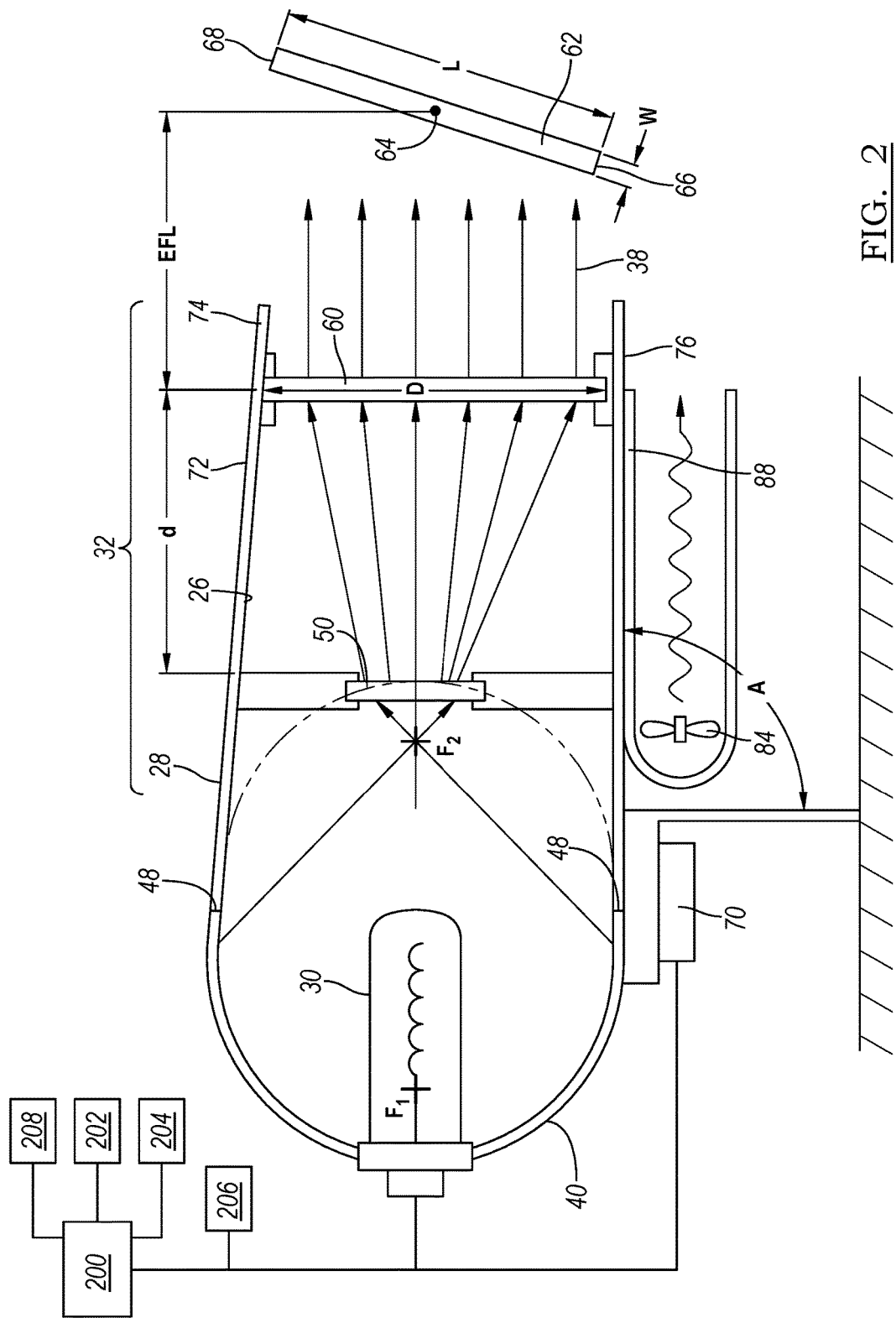
FIG. 2 illustrates a schematic view of a light head of the snow removal system of FIG. 1, according to one embodiment.

FIG. 2 illustrates a cut-away view of the light head 12 according to one embodiment. The light heads 12 include a light housing 20 supported on a mounting leg 24. The mounting leg 24 and housing may be retractable to allow the light heads 12 to retract to a storage position when not required or not in use. For example, the mounting leg 24 may have telescoping segments to allow the light head 12 to telescope between the storage position and an extended use position.

The housing 20 may have an outer shell 22 enclosing an inner shell 28. The outer shell may be formed of high temperature plastic such as Acrylonitrile Butadiene Styrene (ABS). The inner shell 28 may be formed as a tube. In one embodiment, the inner shell 28 is formed of aluminum. The tube may be strengthened by cold working in order to support the optical train 32 without bending. The inner surface 26 of the shell 28 may be polished to a mirror finish or coated to have a highly reflective surface to allow the light to be reflected without undue light loss though the length of the optical train. The inner surface 26 may be conical shaped and formed with an angle, such as an angle of approximately two degrees. Light lost through diffusion may also be roughly guided by the angled inner surface 26 of the tube.

A light source 30 and an optical train 32 are mounted within the housing 20. The light source and optical train 32 are mounted on a supporting plane 36 within the housing. The light source 30 provides radiant light in the visible spectrum. While the light from the light source may be spatially incoherent and diffuse such that light is radiated in all directions, the light source 30 may be oriented so that a major portion of light is radiated generally toward the optical train and housing opening 38.

As shown in FIG. 2, the light source 30 may be a halogen capsule, such as a JCD type bulb. The halogen capsule bulb may be powered at 120-volts for line voltage systems that do not require a transformer, thereby having less energy lost as heat. Halogen bulbs provide brighter, whiter light than incandescent bulbs. The halogen filament provides extremely high intensity, very bright white light. The wattage of a halogen bulb may be varied. For example, the wattage provided to the halogen bulb may be varied from 100-watts for normal operation to 1000-watts during heavy snowfall. The halogen bulb is oriented so that a length of the bulb extends generally parallel to the central axis of the housing 20.

The light source 30 emits light in the visible light range, in particular, light having a wavelength in the blue range of the electromagnetic spectrum. Although lamps and other light sources will continue to be improved for the enhancement of energy efficiency, existing off-the-shelf lamps are energy efficient enough to operate as a cost effective but non-optimized component. Unlike some systems that use more commonly accepted infrared wavelength, the snow removal system 10 recognition uses visible light sources that have the energy output sufficient to energetically counter the accretion of snow and ice. Blue wavelength electromagnetic spectrum light has a peculiar behavior in that it travels along the interstitial lattices in ice and penetrates to depths dictated by inclusions and lattice dislocations in the ice. When the blue wavelength light beam encounters the inclusions and lattice dislocations it is absorbed at those loci and releases heat and mechanical energy, fracturing the ice at those loci.

In order to be effective in the removal (or accretion) of snow and ice, the visible light is concentrated using the optical train 32. The visible light wavelength in the 400 nm to 600 nm wavelength may provide greatest efficiency. This range of the visible spectrum and can be achieved by using a lamp or light source specifically in this emission range or filtering and directing the luminosity of an existing visible light range diode and utilizing the waste heat, also discussed below. The snow removal system may use light sources that shift wavelengths and have adapted filaments so that the emitted light is more directionally coherent and more easily collimated.

The light source 30 is mounted so that all emitting surfaces of the light source 30 are surrounded by and reflected by the reflector 40. The reflector 40 has a through-hole 42 sized to allow insertion of the light source 30. In the example having a halogen capsule bulb, the through-hole may be approximately one-half inch in diameter.

Figure 3:
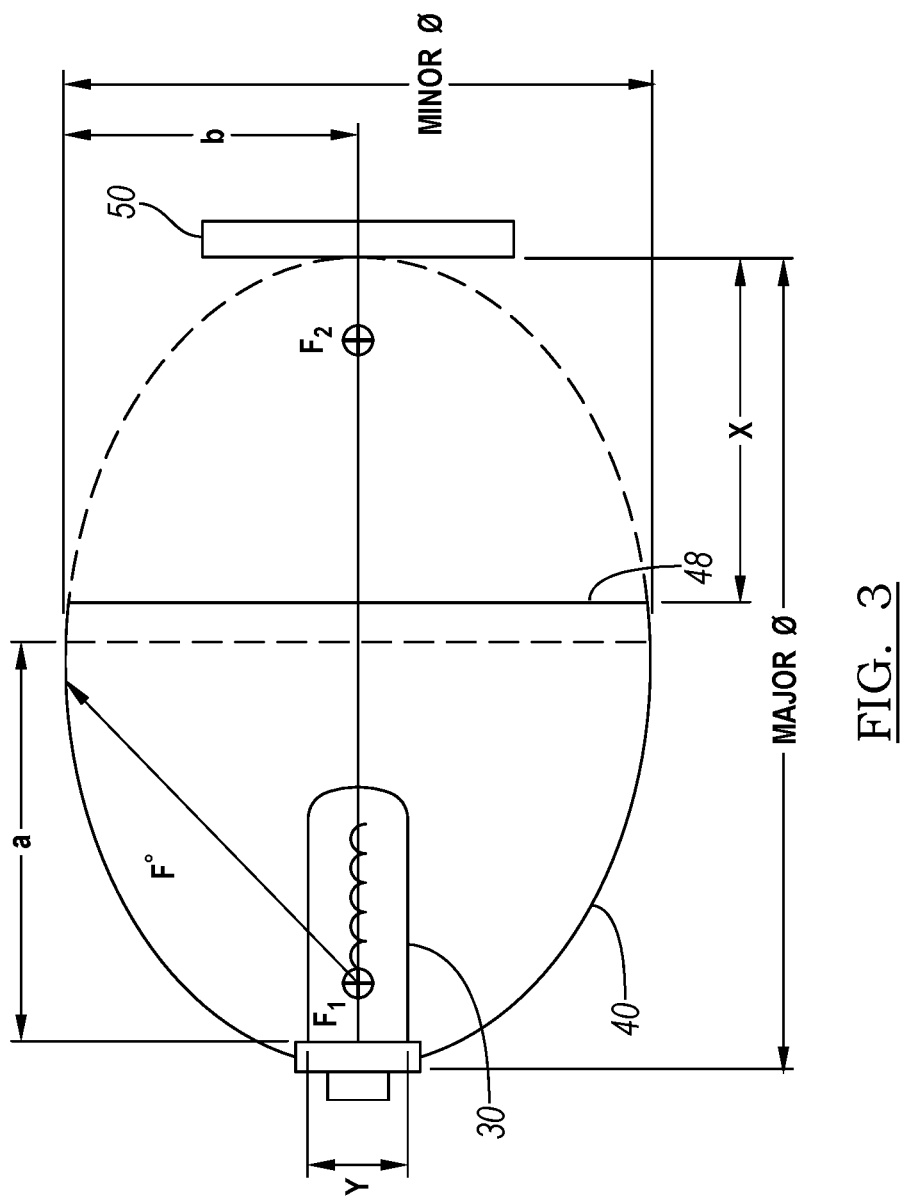
FIG. 3 illustrates a schematic view of a portion of the light head of FIG. 2.

The reflector 40 may be an elliptically-shaped reflector that shapes the light so that light arrays are reflected toward the optical train 32. Due to the optical properties of the elliptical-shape, the light from the bulb is reflected forward. The optical properties of the ellipsoid reflector 40 are such that the reflected light is concentrated in a partially spatially coherent manner and is concentrated into a condensed diameter. By mathematical definition an ellipsoid has two focal points. The light source 30 may be oriented along and placed at the first focal point F1 of the ellipse so that all rays of light that strike the reflector are reflected uniformly into a conjugate, or second, focal point. As shown in FIG. 2-3, the central axis of the light source 30 is also aligned with the major axis 44 of the ellipse. The light reflected from the elliptical-shaped reflector 40 is partially spatially coherent, making the beam easier to concentrate and send forward into the rest of the optical train 32 with limited light losses due to diffusion. As shown in FIG. 2, the light source 30 is mounted on the major diameter of the ellipse.

The ellipse-shaped reflector 40 is defined by a portion of an ellipsoid. An ellipse may be described by the mathematical equation $$\frac{x^2}{a^2} + \frac{y^2}{b^2} = 1 \qquad \text{EQN. 1}$$

where a and b are the major and minor radii, respectively, as shown on FIG. 3.

The open end 46 of the ellipsoid reflector 40 is attached to the tube 28 of the housing 20. The open end 46 may be threaded so that the tube 28 can be screwed into the end 48 of the ellipse reflector 40. By allowing the reflector 40 to be detached from the tube 28, the light source 30 may be easily serviced or replaced whenever required.

The optical train 32 is positioned adjacent the light source 30 and reflector 40 so that direct light and light reflected from the reflector 40 is reflected to the optical train 32. The optical train 32 shapes the light from the light source 30, whether direct or reflected, to a beam for melting snow and ice. Diffuse light, regardless of the wavelength, does not have the energy density to cost effectively melt steady, accumulating snow and ice. In addition light energy outside the blue wavelength range of the electromagnetic spectrum, is 90% reflective to electromagnetic radiation with reflectivity increasing the further that light ranges into the red portion of the spectrum. Diffuse light, such as sunlight or light emanating from a lamp, is effectively scattered and has even less of an energetic concentration the further away it is from the surface, such as surface requiring snow or ice to be melted.

Initiation of snow or ice melting occurs in nature by lattice dislocation. Further, snow melts more quickly when there are large numbers of loci where localized melt conditions create seepage of water. As the snow melts and turns to water, since the water is denser than snow, the water, due to gravity, seeps down and creates melt loci. Once there is a critical number of melt loci the mechanical bond between the surface and the snow energetically dislocates and the mechanical and thermal energy radiates outward in a circular pattern along the bond surface. Similar melt behavior is exhibited in nature when warmer vegetation is observed to have circular pattern melts, such as around the base of trees.

In order to cost effectively use visible light for snow and ice melting over large surface areas, the light emitted from the light source 30 is formed to a critical energy density using the optical train 32 which allows the visible light to melt snow or ice along a surface. Further, to form the light to the critical density, the light source 30, the optical train 32, and rear ellipsoid reflector 40 are centered to each other and held rigidly in line at fixed distances between each of the components.

The light source 30 is mounted adjacent an interior end of the optical train 32. A beam shaping lens 50 is positioned at the interior end of the optical train 32. The beam shaping lens 50 may be a cylindrical lens, such as a cylindrical plano-convex lens. Cylindrical lenses are designed to focus light into one axis only. They are commonly used to focus incoming light into thin lines such as are commonly used in optical metrology. A cylindrical lens is a lens which focuses light into a line instead of a point, as a spherical lens would. The curved face or faces of a cylindrical lens are sections of a cylinder, and focus the light passing through it into a line parallel to the intersection of the surface of the lens and a plane tangent to it. The cylindrical lens gathers the light from the light source 30 and forms it into a linear pattern. The linear pattern will be used to maximize the total coverage area of the beam after the final focusing lens. By using a cylindrical lens, power can be kept dense along a narrow line.

The beam shaping lens 50 is mounted in the tube 28 with a lens holder. Thermal mastic having heat transfer properties at a high temperature range may be applied around the outer diameter of the lens holder. Once cured the mastic holds the beam shaping lens 50 and lens holder in place in the housing 20.

The final optic in the optical train is a final focusing lens 60. The beam shaping lens 50 is sized and position to maximize the light projected to the final focusing lens 60.

$$d = \frac{EFL_{final\ lens} \times EFL_{beam\ shipping\ lens}}{EFL_{final\ lens} - EFL_{beam\ shaping\ lens}} \qquad \text{EQN. 2}$$

The optimal distance D from the final lens 60 is determined by Equation 2 where the effective focal distance (EFL) of each of the final lens 60 and beam shaping lens 50 is used to calculate the position of the beam shaping lens 50 relative to the final lens 60.

The final focusing lens 60 may be a positive meniscus lens. A meniscus lens has one convex and one concave surface. A positive meniscus lens has a steeper convex surface and is thicker at the center than at the periphery. The positive meniscus lens can focus down to a smaller spot size than other focusing optics, such as a plano-convex lens.

The positive meniscus lens projects lights a longer distance in a concentrated rather than diffuse manner. Spherical aberration in a plano-convex lens may open up at the final focusing spot size more than a positive meniscus lens. The final focusing lens 60 allows the concentrated energy to travel a further distance to provide mechanical transfer of heat energy to the surface. The surface warmed by the snow removal system 10 melts snow and ice similar to natural sun-driven snow melting.

The focal length of the final focusing lens 60 may be selected based on the size of the surface 16 to be cleared. For example, the focal length of the final focusing lens for clearing a relatively narrow sidewalk will be less than the focal length of a final focusing lens for clearing a driveway. Similarly, the focus length for clearing a parking lot may be even longer. The desired diameter F of the final focusing lens 60 may be determined based on the equation $$\frac{EFL_{final\ lens}}{D_{final\ lens}} = \frac{1}{2 \times \text{refractive index}_{air} \times \sin \text{focus} \sphericalangle} \qquad \text{EQN. 3}$$

where the refractive index of air and the angle of the plane normal to the surface of the final focusing lens to the point of focus achieved by the final focusing lens are accounted for. For example, for a desired focal length of 6 feet, or 72-inches, and an angle of 2.5 degrees, the desired diameter F of the final lens would be one inch. Other diameters of final focusing lenses may be used. In another example, for a desired focal length of 3 feet, or 36-inches, and an angle of 5 degrees, the desired diameter F of the final lens would be two inches.

The final focusing lens 60 projects an elongated light beam 62 that has a shape of a focused line having a length L and a width W. The width W of the focused line 62 may be determined based on the equation $$2W = \frac{4 \times EFL_{final\ lens} \times \lambda}{\pi \times D_{final\ lens}} \qquad \text{EQN. 4}$$

where λ is the average wavelength of light from the light source 30. In one example where the average wavelength λ is 550 nm and the EFL of the final lens is 72 inches and the diameter D of the final lens is one inch, the resulting width W of the focused line is one-half inches. In this example, the length L of the focused line is 12-inches. The maximum power density and sharpest focus of the focused line 62 is at the mid-point 64 which is located at the EFL. The focused line is defined by an inner edge 66 and an outer edge 68, with the inner edge 66 being closest to the light head 12.

The final focusing lens 60 may be attached to the distal opening of the housing. The final focusing lens 60 may be held with a lens holder. Alternatively, the housing 20 may have an external threaded portion on an outer surface 72 along a distal end 74. A lens holder holding the final focusing lens may be threaded to engage with the threaded portion over the end of the housing. This also allows for ease of maintenance and an easy replacement of the final focusing lens. The lens holder may have a lip that extends over the final focusing lens to protect the lens. The angled inner surface 26 of the housing 20 allows for the distal opening to be smaller in diameter than the diameter of the housing at the proximal end of the optical train 32.

A rotating motor 70 is provided in the snow removal system 10. The motor 70 rotates the light head 12 in two directions. The light head 12 rotates to change a tilt angle A, as shown in FIG. 2, between the light head 12 and the surface. The light head 12 also rotates about the mounting leg 24 to sweep the light across the surface at a sweep angle B, shown in FIG. 1. The rotating motor 70 may include a fractional DC motor and gear components, for example.

The tilt angle A may be varied to change the distance from the housing that the light beam contacts the surface. In one embodiment, the tilt angle A may vary between 25-degrees and 45-degrees. For example, at a tilt angle of 25-degrees, an inner edge 66 of line of light is 150 mm away from the distal end 74 of the housing 20. The title angle A may be increase up to a point where the furthest edge 68 of the line of light extends at a distance of 4.5 meters from the distal end 66 of the housing 20.

The light head 12 may be rotated about the mounting leg in a full circle, or where the sweep angle B is 360 degrees. However, the sweep angle B may be limited based on the surface to be cleared of snow. For example, the sweep angle B may be 90-degrees, 180-degrees, 220-degrees or any suitable sweep angle. Full range of motion of the light head 12 may be achieved by varying the tilt angle A while rotating the light head 12 about the sweep angle B.

An outer surface 70 of the housing 20 is coated with insulation. For example, the outer surface 70 may be coated with a medium density closed cell polyurethane insulating foam. A heat sink 74 is attached to a bottom surface 76 of housing 20. The heat sink 74 allows waste heat to be transferred away from the optical train 32. The heat sink 74 includes fins 78 that conform to the shape of the tube at the top and form spaced apart fins at the bottom. In another embodiment, the heat sink 74 may be connected to the plane 36 supporting the optical train 32.

The finned heat sink 74 is encased in the outer shell 80, such as high temperature plastic like Acrylonitrile Butadiene Styrene (ABS). A fan 84 is positioned adjacent to the heat sink. When the snow removal system 10 is in operation, the fan 84 circulates the waste heat generated from the optical train 32 forward toward the surface, the waste heat keeping the surface adjacent the light head 12 clear of snow and ice.

An additional heat sink 88 may be connected to the light source 30, along the electrical socket, for example. The heat sink 88 may be connected to the mounting leg 24 to transfer heat to the surface directly adjacent the mounting head, thereby creating an additional melt locus around the mounting leg 24 of the snow removal system 10.

Figure 4:
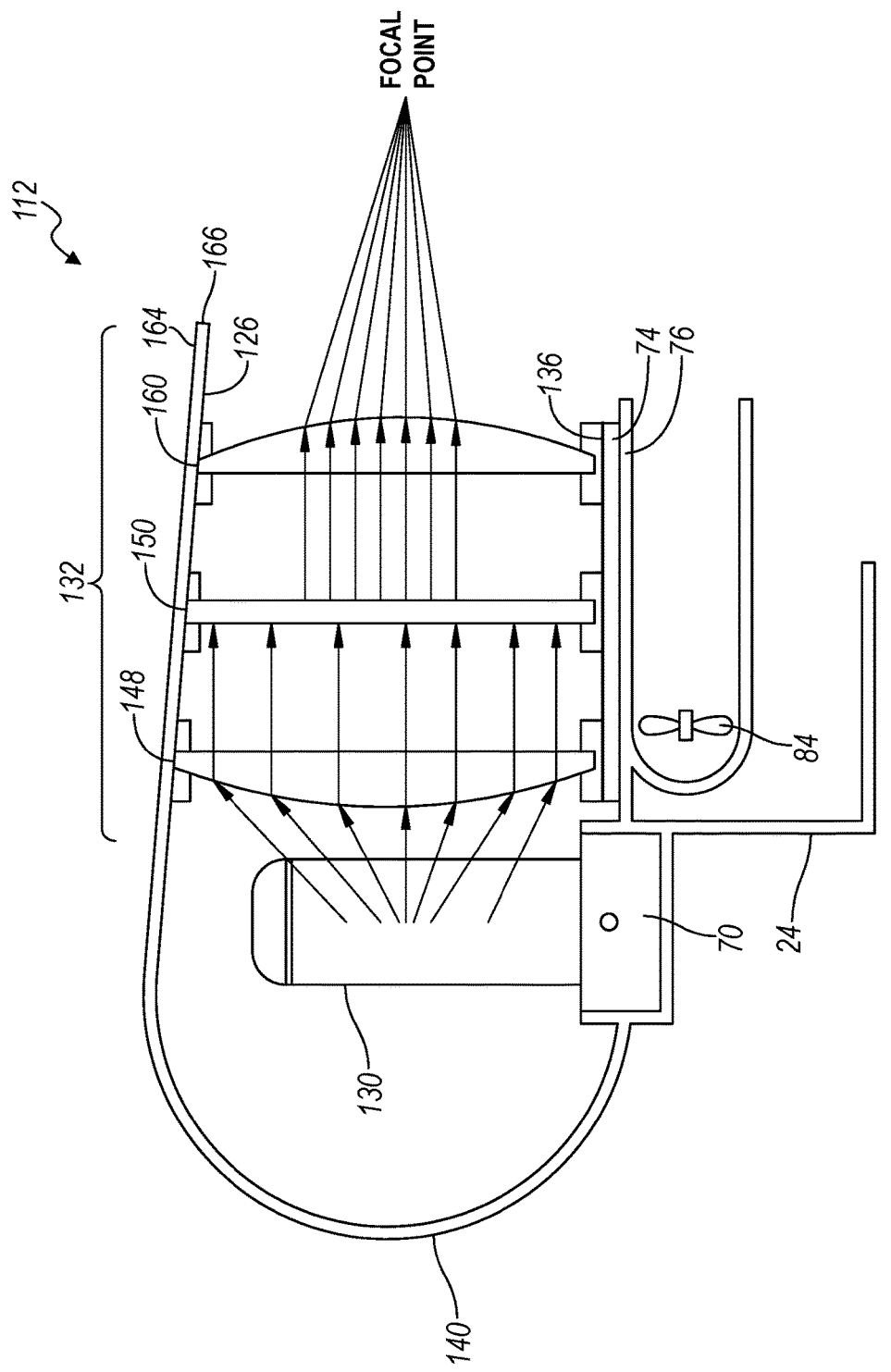
FIG. 4 illustrates a schematic view of a light head of the snow removal system of FIG. 1, according to another embodiment.

FIG. 4 illustrates a detailed view of a light head 112 according to another embodiment for concentrating light and melting snow and ice. A light source 130 and an optical train 132 are mounted within the housing 120. The light source 130 and optical train 132 are mounted on a supporting plane 136 within the housing. As schematically shown in FIG. 4, the visible light source 130 is a standard incandescent flood bulb having a filament, such as an 85-watt flood bulb. The flood bulb has a large diameter face, such as a 4-inch diameter face, and power is provided via a standard screw in a receptacle plug providing 110-volts. The flood bulb is oriented so that the large face is generally parallel to the housing opening 138. Other incandescent bulbs or other bulbs such as commercially available bulbs may be used for providing visible light.

As shown in FIG. 4, the housing 120 includes a reflector 140 positioned adjacent to the light source 130. The reflector 140 may be a suitable reflector for reflecting light arrays toward the optical train 132. For example, the reflector 140 may be an elliptical reflector, a spherical reflector, a parabolic reflector or any suitable shaped reflector to reflect diffuse light toward the optical train 132. The reflector 140 may be designed to reflect linear arrays where the light source 130 is an incoherent light source, such as in the case of the use of many commercially available bulbs. The reflector 140 may be designed to reflect doughnut-shaped arrays for use with directional bulbs.

The optical train 132 is positioned adjacent the light source 130 and generally opposite the reflector 140 so that light reflected from the reflector 140 is reflected to the optical train 132. The optical train 132 shapes the light from the light source 130, whether direct or reflected, to a beam for melting snow and ice. A collimating lens 148 is positioned at the interior end of the optical train 132. The collimator 148 receives shaped light from the back reflector 140 and diffuse light from the light source 130 and counterintuitively and in a way that goes against the common method and usage for a light collimator, generates a directionally collimated and concentrated beam that consists of a Gaussian distribution of energy overlaid with faceted hot spots. The collimator 148 is a large optic intended to absorb as much of the emitted light from the light source 130 as possible.

The next optic in line in the optical train 32 is an optical reducer 150. The reducer 150 reduces the incoming collimated light to a smaller diameter so that a larger amount of usable light contacts the next optic, the final focusing lens, in a reduced diameter and with the refractive directionality oriented to make the light more concentrated. This concentrated light exiting the reducer 148 is easier to focus since the spatial orientation would be in the reducing instead of diffusing direction. The reducing optic 150 reduces the overall beam diameter 1.5 times and projects the light, still essentially parallel, onto the final focusing lens.

Depending on the geometry of the final focusing lens 160, a reducer 150 may not be required. The final optic in the optical train is a final focusing lens 160. The final focusing lens 160 may be a positive meniscus lens. The focal length of the final focusing lens 160 may be selected based on the size of the surface 16 to be cleared.

The final focusing lens 160 may be tilted at an angle relative to the housing 120 and at an angle relative to the other optics in the optical train 132. The final focusing lens 160 may be tilted at an angle calculated to accept the collimated beam and focus it to a required effective focal distance while simultaneously elongating the beam waist into a linear or "stretched" donut array that comes in contact with the surface to be heated. For example, the final focusing lens 160 may be tilted to achieve an effective focal distance of 17.5-inches.

In one example, the collimator 48 has a diameter of approximately three inches, the reducer 150 has a diameter of approximately two inches and the final focusing lens 160 has a diameter of approximately one-half inch.

FIG. 2 and FIG. 4 schematically illustrate optical trains that concentrate visible light into a high energy density that is semi-coherent at a great distance away from the light source. The photonically concentrated light beam is capable of melting snow and ice over large surface areas when the beam is rotated. For example, a light source, such as an 85-watt flood light bulb, may have a power density of 1.7 watts/square-inch directly in front of the face. However, the flood light bulb radiates extremely diffuse light, so even a short distance away from the face, the power density is negligible. The optic trains 32, 132 concentrate the light from the light source so that the light is spatially coherent and concentrated a long distance, such as three feet, from the light source to melt snow and ice on a surface, such as a driveway or sidewalk.

The photonic concentration of light uses power density of light for lattice dislocation of the snow as the primary mechanism of removal of the snow and ice and is not dependent on an amount of heat generated by the elongated light beam. For example, in FIG. 4, after each of the collimator 148, the reducer 150 and the final focusing lens 160, the light is concentrated 40% more resulting in a linear beam being at least 250% more photonically concentrated. The optic train 130 is able to melt snow at an ambient temperature of 20-degrees Fahrenheit at a distance of 18-inches from the final focusing lens 160, even with less than 1% efficiency.

For the light head 30 illustrated in FIG. 2, the power density of the concentrated light beam may be calculated by the equation $$\text{Power density} = \frac{\text{Power} \times \text{efficiency}}{W \times L} \quad \text{EQN. 5}$$

where the power density is at the mid-point 64 of the focused line 62. For example, at 100-watts and 25% efficiency, for a beam having a width W of one-half inch and a length L of 12-inches, the resulting power density is 4.2 watts/square-inch. Increasing the power to 1000-watts yields a power density of 41.7 watts/square-inch.

The snow removal system 10 also includes a controller 200 for controlling operation of the system 10. The snow removal system 10 may be manually operated so that a user turns on the snow removal system when snow and ice removal is desired. The snow removal system 10 may also be operated automatically based on variables such as predicted weather, snowfall, ice accumulation and ambient temperature, for example.

The controller 200 includes wireless communication and application protocol. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electrical devices may be configured to execute a computer-program that is embodied in a non-transitory computer readable medium programmed to perform any number of the functions as disclosed.

The controller 200 may use small, low-power digital radios to form a self-organizing, self-healing "mesh network". The controller 200 utilizes wireless communications to evaluate weather data to turn on the system 10 with a self-modeling and predictive algorithm. The controller 200 may have wireless as well as wired cable input so that the controller 200 can communicate with any type of home entertainment system. In this way televised weather information can be received and acted upon, regardless of the homeowner cable or satellite preference.

In order to translate weather data, the controller 200 may use software-defined radio (SDR) which picks up electromagnetic waves almost directly at the antenna and uses software to process them. Applications for implementing SDR include GNU Radio, GNU Radio Companion, or Gqrx. The controller 200 will also contain an editor to process the digitized radio data. The GNU Radio Framework analyzes the received radio signals and includes a graphical editor that supports raw data signal processing and automatically generates code that processes the data. The data is fed into the controlling algorithm as one of the inputs that drives the performance of the system.

The snow removal system 10 may also include a temperature sensor 202. In either automatic or manual modes, when the temperature sensor 202 detects a threshold temperature, the snow removal system 10 is turned activated to a stand-by mode where the light heads 12, 112 are provided a low power to prevent icing in the optical train 32, 132. For example, when the temperature sensor 202 detects the ambient temperature is 33-degrees Fahrenheit, or just above freezing temperature, the controller 200 provides 0.05-amps of current at 7-volts to the light source. This low current and voltage may not be enough power to turn the light source on, but keeps the optical train from accumulating ice or frost.

Figure 5:
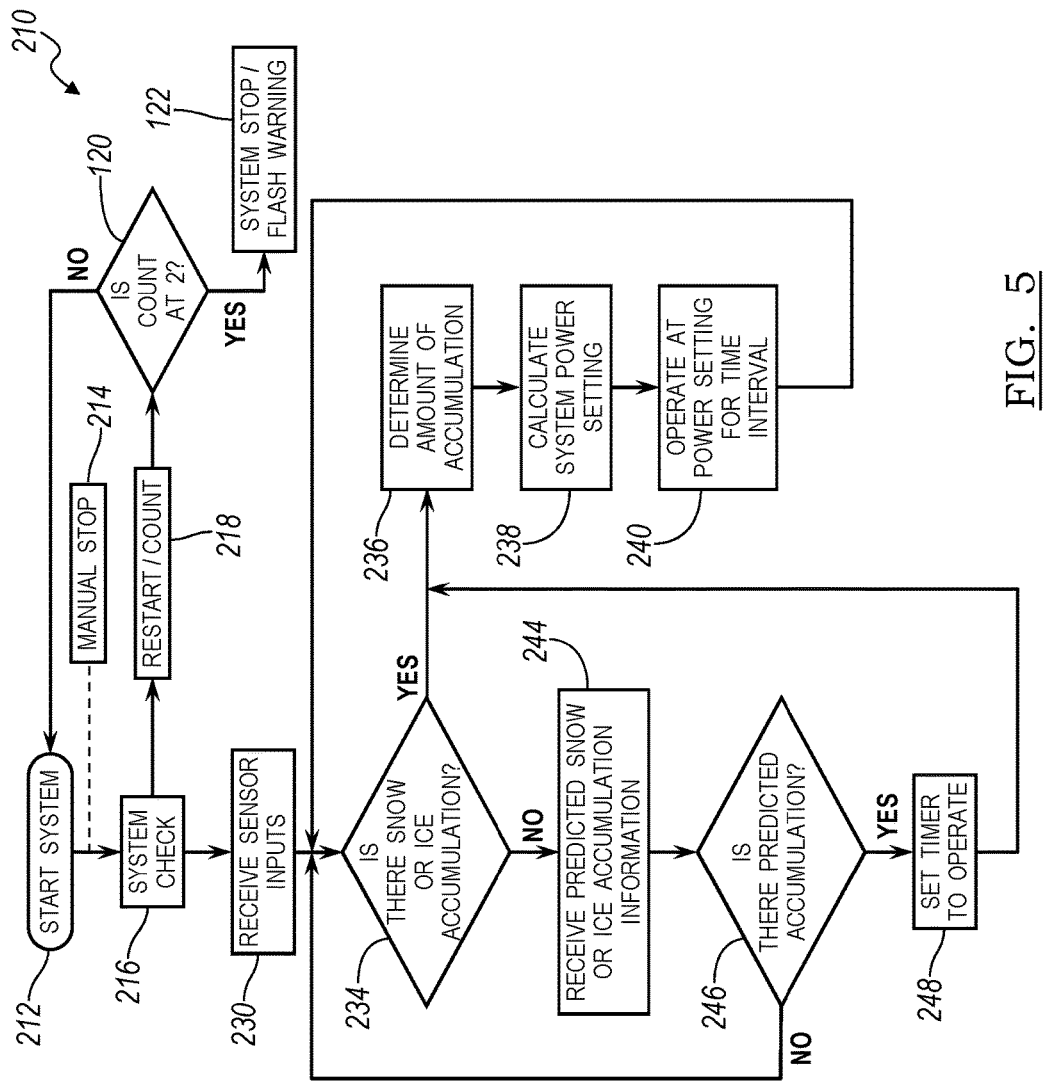
FIG. 5 illustrates a method for controlling the snow removal system in FIG. 1.

FIG. 5 illustrates a method 210 for operating the snow removal system 10. The system is started and power is applied to the system at step 212. As the system is started, either manually or automatically, the system configuration is checked. The controller 200 determines if the system is a manual system or an automatic system. If the system is a manual system, then the controller 200 checks start-up inputs such as electrical continuity and current flow at all of the light heads. If there are faults in the start-up inputs, the controller 200 may try to restart after a short wait, such as a five-second wait. If the controller 200 detects any faults, such as shorts or bulb faults, the controller 200 will prevent the system from being started or from having a manual start. Any shorts in the bulb power will cause the system to shut down and a service warning will be given. If there are no faults in the start-up inputs, the system turns on to a minimum power, such as at 10% power.

For either manual or automatic operation, a manual stop button at step 214 must be deactivated, or reset to a start position. If the manual stop button is activated, a message will flash the operator to reset the manual stop button.

If the manual stop button is deactivated, a full system check is completed, at step 216. The full system check checks all sensor and bulb functions. If sensors are not functioning, the controller 200 will display a message that allows the operator to run the system 10 without sensor input. If some bulbs in some light heads are not functioning, the controller 200 will display a message allowing the operator to operate the system without all of the bulbs functioning, or prompting the operator to change the bulbs. If bulbs are changed, the system will restart on a command from the operator. If more than half of the bulbs have no continuity, the system will shut down and go to restart with a start count of 1, at step 218

The controller 200 will allow for a maximum of two restarts faulting out, at step 220. In either the manual or the automatic modes, at the conclusion of two unsuccessful restarts, the controller 200 stops the system, at step 222. When the controller 200 stops the system, the controller 200 will flash a warning and power will be cut to the system except for the controller 200. The controller 200 may then be accessed for diagnostic trouble codes to identify locations of power or sensor failures. If there is one light head with a fault, that light head may be disconnected from the main system so that continuity is restored to the remaining light heads. After a wait, such as five-minutes, the system may be restarted.

In a manual system, once the system is on, it will continue operation until the manual stop button is actuated. Once the system is turned on for automatic operation, sensed system inputs at step 230 determines operation of the system 10. Before the system operates at full power, the controller 200 determines if sensor inputs indicate that conditions warrant the operation of the light heads to melt snow and ice. For example, the temperature sensors 202 may indicate that weather conditions below 32-degrees Fahrenheit might require operating the system to melt snow and ice that may form at temperatures below freezing. The system 10 may also include a humidity sensor 204 and a precipitation sensor 208.

At step 234, the controller 200 determines if there is snow or ice accumulation. The humidity sensor 204 and temperature sensor 202 may indicate that precipitation is imminent or occurring. The controller 200 receives humidity and temperature input and may determine precipitation based on an algorithm or look up table, for examples. The controller 200 further determines if there is snow or ice accumulation based on input from the precipitation sensor 208.

In step 236, the controller 200 determines the amount of accumulation with the precipitation sensor 208. The precipitation sensor 208 may include motion sensors for detecting relative movement of precipitation. The motion-type precipitation sensors may sense the amount of snowfall by measuring the percentage amount of proximity interference. For example, a small "flurry" type snowfall may indicate approximately 4% sensor saturation amount, while a precipitation rate of six inches per hour may indicate a 55% saturation amount. If the amount of accumulation is greater than a threshold, the controller 200 may determine precipitation based on input from the precipitation sensor 208 which will be set to trigger system operation once a threshold is met. The accumulation threshold may be low so that small flurries, such as 4% concentration per square meter, meet the threshold. In another embodiment, the threshold may require a greater amount of accumulation. Other suitable precipitation sensors may be utilized.

In step 238, the controller 200 calculates the power output setting based on the amount of precipitation. Between the minimum accumulation threshold and a second accumulation threshold, the controller 200 may vary the power output setting proportionally between a minimum power level and a maximum power level. For example, the second accumulation threshold may be at the 55% saturation of the motion-type precipitation sensor.

At step 240, the system 10 operates at the calculated power output setting for a time interval. In one embodiment, the system operates for 15-minutes before the controller 200 determines if the power setting needs to be changed. As long as the accumulation thresholds are met, the system will operate at the indicated power levels for set time minute increments until the levels are not met.

At step 244, if snow or ice accumulation is not recorded or the humidity and temperature sensors do not trigger or indicate imminent precipitation, the system receives predicted accumulation information. The controller 200 receives predicted accumulation information from commercial weather prediction services, such as the Weather Channel® or may generate predicted accumulation information based on the Kohonen precipitation algorithm to predict the likelihood of precipitation.

Both the Kohonen mapping algorithm and received weather data, such as the Weather Channel data, provide predictions of weather at least 30-minutes in advance. The Kohonen mapping algorithm is a micro weather predictor that provides written estimate weather patterns. Over time, the Kohonen mapping algorithm will gather weather history at a specific location. The Kohonen mapping algorithm allows the system 10 to estimate the probability of precipitation based on local conditions measured by the system sensors 202, 204, 208.

While generating data for Kohonen, the controller 200 will defer the predicted weather services, such as the Weather Channel. For example, the controller 200 will defer to predicted weather services for at least a month. After the data with Kohonen and the weather service data is compared, the controller 200 will use the prediction information that has the most accuracy in to proactively operate the system 10. Accuracy is established by noting prediction accuracy at half hour intervals and sensing actual precipitation. If the weather service data or the Kohonen mapping algorithm has the best accuracy, the system weights the predictions and deploys according to the predictive data with the highest accuracy.

If there is predicted accumulation, the controller 200 sets time to operate the system in advance of the predicted accumulation at step 248. For example, the controller 200 may set the timer to operate the system 30-minutes in advance of the predicted accumulation. In another embodiment, the controller 200 sets the timer to operate the system at a predetermined time interval in advance of the predicted accumulation. The controller 200 continues to determine the amount of accumulation at step 236 and calculate the power setting at step 238, as described above.

Each of the lights heads may also include a proximity sensor 206. Proximity sensors provide a signal to the controller 200 when a person, animal or object is adjacent to the light head and potentially in a light path at step 226. The proximity sensors 206 prevent waste of waste energy if, for instance, a car is parked in the way of the light in the driveway. At any time during operation of the light heads, if the proximity sensors are activated, power to the light head is turned off until the proximity sensor indicates no objects are in the light path. Other light heads may continue to operate if the object is not in other light paths.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
   a light head mounted to rotate;
   a light source mounted in the light head and radiating visible light;
   an optical train mounted in the light head adjacent the light source to focus the visible light to a concentrated light beam line being directionally focused; and a controller in communication with the light head, the controller programmed to rotate the light head thereby sweeping the concentrated light beam along a surface.

2. The system according to claim 1, wherein the controller is programmed to operate the light source based on a weather forecast.

3. The system according to claim 1, wherein the controller is programmed to operate the light source based on an outside temperature.

4. The system according to claim 1, wherein the light head is retractable when not in use.

5. The system according to claim 1, further comprising a plurality of light heads, each light head having a light source and an optical train, wherein the controller is in communication with each of the light heads.

6. A system comprising:
a housing;
a light source positioned in the housing and radiating generally diffuse visible light;
an optical train mounted in the housing adjacent the light source to focus the diffuse visible light to a concentrated light beam line between a first optic and a final optic; and
wherein the concentrated light beam has a concentrated power density at a focal distance from the final optic that is greater than a first power density at the first optic.

7. The system according to claim 6, wherein the first optic comprises a lens to receive the diffuse visible light from the light source and project a spatially semi-coherent light beam toward the final optic.

8. The system according to claim 6, wherein the final optic is a positive meniscus lens.

9. The system according to claim 8, wherein the first optic comprises a collimating lens.

10. The system according to claim 8, wherein the first optic comprises a plano-convex cylindrical lens.

11. The system according to claim 6, wherein the first optic has a first focal distance that is less than the final focal distance.

12. The system according to claim 6, wherein the optical train comprises a second optic mounted in the housing between the first optic and final optic, the second optic projecting a second power density greater than the first power density, wherein the final power density is greater than the second power density.

13. The system according to claim 6, further comprising a controller in communication with the housing, the controller programmed to command the housing to rotate the housing thereby sweeping the concentrated beam along a surface.

14. The system according to claim 13, further comprising at least one sensor for sensing at least one of ambient temperature, ambient humidity and precipitation and providing a sensor signal to the controller, wherein the controller is programmed to operate the light source based on the sensor signal.

15. A system comprising:
a housing with an ellipse portion and a tube portion;
a light source mounted in the ellipse portion and radiating generally diffuse visible light;
a reflector formed in the ellipse portion for reflecting the diffuse visible light from the light source;
a first lens mounted in the tube portion and positioned at a major diameter of the reflector, wherein the reflector reflects the light toward the first lens, the first lens shaping the light in a line-shaped beam; and
a second lens mounted in the tube portion, wherein the first lens projects the line-shaped beam toward the second lens, the second lens focusing the line-shaped beam to a concentrated beam having a concentrated power density at a second lens focal distance that is greater than a first power density at the first lens.

16. The system according to claim 15 wherein the second lens focal distance is greater than the first lens focal distance.

17. The system according to claim 15 wherein light reflected from the reflector is partially spatially coherent.

18. The system according to claim 15 further comprising a motor connected to the housing for rotating the housing and thereby sweeping the concentrated beam over a surface.

19. The system according to claim 15 wherein the light source comprises a halogen bulb.

20. The system according to claim 15 wherein the first lens is mounted a distance from the second lens based on the second lens focal distance.

* * * * *